US011143314B1

(12) United States Patent
Jackson et al.

(10) Patent No.: US 11,143,314 B1
(45) Date of Patent: Oct. 12, 2021

(54) METHODS AND APPARATUS TO LOAD A VALVE PACKING

(71) Applicant: FISHER CONTROLS INTERNATIONAL LLC, Marshalltown, IA (US)

(72) Inventors: Trenton Frank Jackson, Marshalltown, IA (US); Wade Jonathon Helfer, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 16/829,894

(22) Filed: Mar. 25, 2020

(51) Int. Cl.
*F16K 5/06* (2006.01)
*F16K 41/02* (2006.01)
*F16K 5/20* (2006.01)
*F16K 41/04* (2006.01)
*F16J 15/18* (2006.01)

(52) U.S. Cl.
CPC ........... *F16K 5/0694* (2013.01); *F16J 15/186* (2013.01); *F16K 5/201* (2013.01); *F16K 41/026* (2013.01); *F16K 41/04* (2013.01)

(58) Field of Classification Search
CPC ........ F16K 5/0694; F16K 41/00; F16K 41/02; F16K 41/023; F16K 41/026; F16K 41/04; F16K 41/043; F16K 41/046; F16J 15/186; F16J 15/185; F16J 15/184; F16J 15/18
See application file for complete search history.

(56) References Cited

U.S. PATENT DOCUMENTS

| 2,130,741 | A | * | 9/1938 | McClain | ................ F16J 15/184 277/520 |
| 2,308,475 | A | * | 1/1943 | Fawkes | .................. F16J 15/186 277/510 |
| 3,968,970 | A | * | 7/1976 | Vogeli | .................... F16J 15/186 277/522 |
| 4,577,873 | A | * | 3/1986 | Baumann | ................. F16J 15/18 277/520 |
| 5,129,625 | A | * | 7/1992 | Wood | ..................... F16J 15/186 251/214 |

(Continued)

FOREIGN PATENT DOCUMENTS

| CA | 2261306 A1 | * | 8/2000 | ............. F16K 41/02 |
| JP | H11166628 | * | 6/1999 | |

OTHER PUBLICATIONS

Emerson, "Fisher Z500 Severe Service Ball Valves Product Bulletin 51.3:Z500," dated Jan. 2020, 32 pages.

*Primary Examiner* — David Colon-Morales
(74) *Attorney, Agent, or Firm* — Hanley, Flight & Zimmerman, LLC

(57) ABSTRACT

Methods and apparatus to load a valve packing are described. An example load apparatus to load a valve packing includes a guide including a flange and a wall protruding from the flange. The wall defines a cavity to receive a biasing element and a stop movable between a non-active state and an active state. The stop in the non-active state to enable movement of the guide in a first rectilinear direction relative to a longitudinal axis of a packing bore of a fluid valve and the stop in the active state to prevent movement of the guide in the first rectilinear direction. The stop to control an amount of deflection of the biasing element in the first rectilinear direction when the stop is in the active state.

20 Claims, 10 Drawing Sheets

(56) References Cited

U.S. PATENT DOCUMENTS

| | | | | |
|---|---|---|---|---|
| 5,190,264 A * | 3/1993 | Boger | ............... | F16J 15/186 |
| | | | | 251/214 |
| 5,192,049 A * | 3/1993 | Ridge | ............... | F16J 15/186 |
| | | | | 251/214 |
| 5,230,498 A * | 7/1993 | Wood | ............... | F16J 15/186 |
| | | | | 137/553 |
| 5,290,010 A * | 3/1994 | Ridge | ............... | F16K 41/02 |
| | | | | 251/214 |
| 5,549,305 A * | 8/1996 | Freund | ............ | F16J 15/186 |
| | | | | 15/316.1 |
| 7,753,339 B2 * | 7/2010 | Yuzawa | ............ | F16K 41/02 |
| | | | | 251/214 |
| 7,963,502 B2 * | 6/2011 | Lovell | ............... | F16K 41/02 |
| | | | | 251/214 |
| 8,281,797 B2 * | 10/2012 | Brestel | ............ | F16K 41/026 |
| | | | | 137/15.18 |
| 8,613,423 B2 * | 12/2013 | Hutchens | ........ | F16K 41/02 |
| | | | | 251/214 |
| 8,863,768 B2 * | 10/2014 | Kang | ............... | F16K 43/00 |
| | | | | 137/315.28 |
| 9,863,552 B2 * | 1/2018 | Fan | .................. | F16K 5/0663 |
| 10,234,035 B2 * | 3/2019 | Nitta | ................ | F16K 41/04 |
| 2007/0040141 A1 * | 2/2007 | Mahncke | ......... | F16K 41/02 |
| | | | | 251/214 |

* cited by examiner

METHODS AND APPARATUS TO LOAD A VALVE PACKING

FIELD OF THE DISCLOSURE

This disclosure relates generally to fluid valves and, more particularly, to methods and apparatus to load a valve packing.

BACKGROUND

Process control plants or systems often employ fluid valves, such as rotary valves, linear valves, etc., to control the flow of process fluids. In general, fluid valves typically include a fluid flow control member that is disposed in the fluid path and which is operatively coupled to an actuator such as, for example, a pneumatic actuator, a manual actuator, etc. A valve stem or shaft operatively couples the flow control member to the actuator, which moves the flow control member between an open position and a closed position to allow or restrict fluid flow between an inlet and an outlet of the valve. Typically, the valve stem or shaft extends between the flow control member and the actuator through a bonnet coupled to the valve body.

SUMMARY

In one example, a load apparatus to load a valve packing includes a guide including a flange and a wall protruding from the flange. The wall defines a cavity to receive a biasing element and a stop movable between a non-active state and an active state. The stop in the non-active state to enable movement of the guide in a first rectilinear direction relative to a longitudinal axis of a packing bore of a fluid valve and the stop in the active state to prevent movement of the guide in the first rectilinear direction. The stop to control an amount of deflection of the biasing element in the first rectilinear direction when the stop is in the active state.

In another example, a load apparatus includes a guide movably coupled to a fluid valve. The guide defines a body having a cavity and a stop. The body forms a shoulder in the cavity between a first end of the body and a second end of the body opposite the first end. The stop protrudes from the body. A biasing element is positionable in the cavity of the guide. The shoulder to engage a first end of the biasing element. A second body engages a second end of the biasing element opposite the first end. The guide to move in a first rectilinear direction toward the second body to deflect the biasing element when the stop is spaced from the second body. The guide is prevented from moving in the first rectilinear direction when the stop engages the second body to restrict further deflection of the biasing element in the first rectilinear direction to control an amount of deflection of the biasing element in the first rectilinear direction.

In another example, a load apparatus includes means for guiding a biasing element. The means for guiding including means for receiving and means for stopping. The means for stopping is configured to be positionable between a non-active state and an active state. The means for stopping in the non-active state to enable movement of the means for guiding in a first rectilinear direction relative to a longitudinal axis of the means for receiving. The means for stopping in the active state to prevent movement of the means for guiding in the first rectilinear direction relative to the longitudinal axis.

Figure 1:
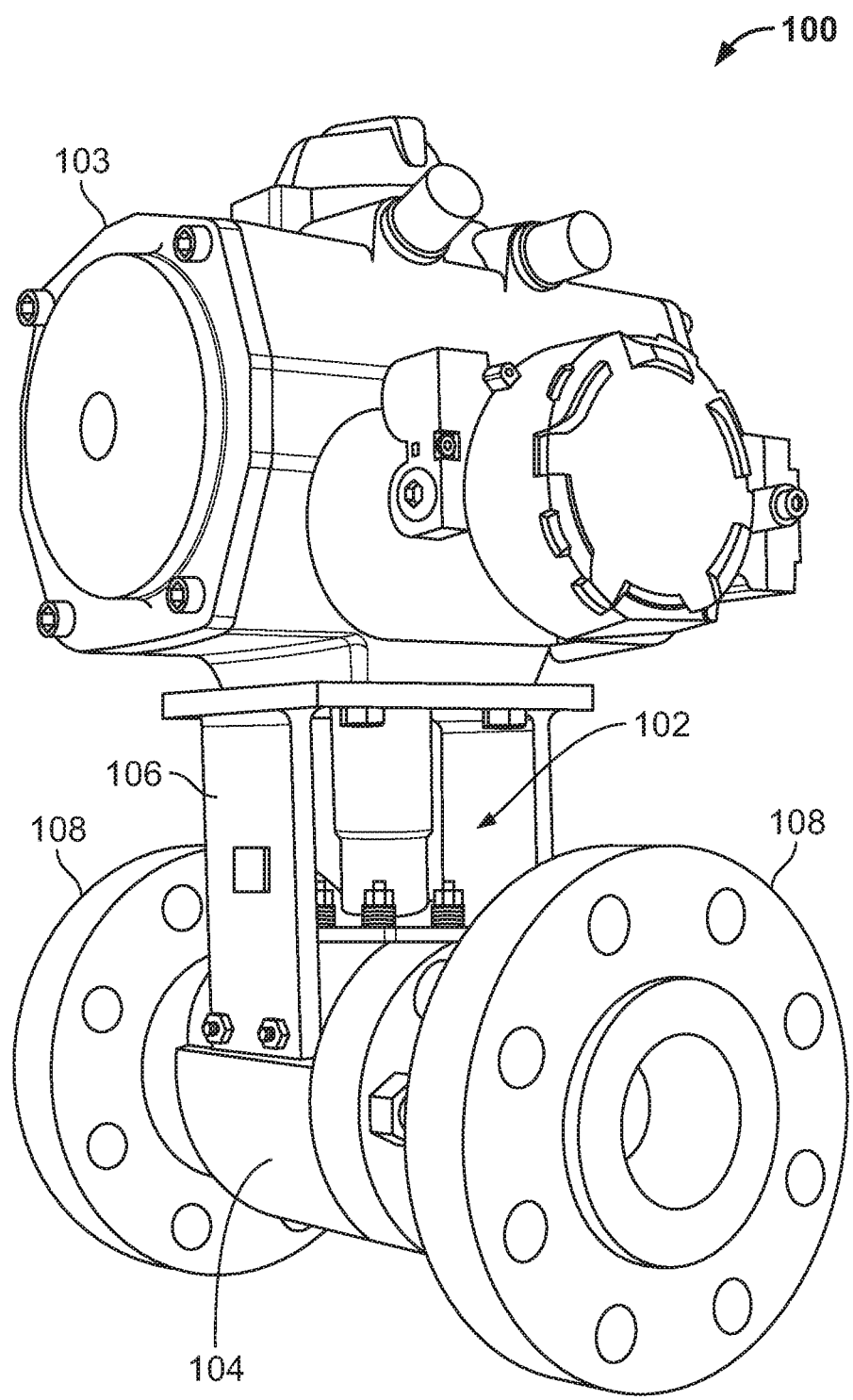
FIG. 1 is a perspective view of an example fluid valve including an example load apparatus in accordance with the teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

DETAILED DESCRIPTION

A valve packing or packing assembly is often employed to prevent undesired leakage of process fluid to the environment through the valve body along the valve stem or shaft. The valve packing may include a plurality of packing seals disposed along a portion of the valve stem or shaft to provide a seal. Some known valve packings employ a high-spring rate loading device or spring assembly (e.g., Belleville springs) to provide a relatively high load over a relatively small range of deflection or compression. However, such known loading devices typically require very precise deflections and/or tightly held manufacturing tolerances to enable a desired packing stress to be applied to the packing seals.

To maintain a seal between a valve body and a shaft when a valve is in service, packing seals of a valve packing need to be properly stressed. Failure to provide a desired packing stress to the packing seals may cause an improper seal. A packing stress that is too low may cause the process fluid to leak to the environment through the packing seals. A packing stress that is too large (e.g., greater than a maximum recommended packing stress) may cause some types of packing seals (e.g., graphite seals) to transfer material to a valve shaft, thereby causing build-up of material on the valve stem and damaging the packing seal. In some instances, packing stresses that are too high can increase packing friction between the packing seals and the valve stem or shaft, which can reduce valve performance and/or the operational life of the valve packing and/or the valve stem or shaft.

For example, one method to adjust or control deflection of biasing elements to impart a packing stress to a valve packing is to measure a torque applied to a packing nut by using, for example, a torque wrench. However, a torque wrench may be unreliable due to, for example, variability of lubrication on a packing stud and/or a packing nut, different manufacturing processes used to form threads of the packing studs, the number of times a packing stud and a packing nut have been used, etc. Such inaccurate loading from torque measurements may cause inaccurate packing stresses or loads to be applied to a packing material of a valve packing. As a result, premature failure of the packing material may occur even if the torque reading on the torque wrench indicates an acceptable torque measurement. Thus, measuring the packing nut torque to determine a proper packing stress may not be adequate to prevent premature failure of some packing materials such as a graphite packing material.

Another method to control packing stress is to position a biasing element of a loading apparatus (e.g., Belleville springs) to a maximum compression, flat or solid condition. In this manner, compressing or deflecting the biasing element to the fully flat or solid condition provides an indication of the maximum possible load that can be provided by the biasing element. Packing nuts are then loosened or backed off a certain amount (e.g., one-quarter of a turn or rotation) to decompress the biasing element to a desired position that provides a nominal or desired packing stress to a packing material. For example, an operator or maintenance person subsequently loosens a packing nut a precise number of rotations or portion of a rotation (e.g., one-quarter of a rotation) to set the packing stress to a desired stress level. However, in some instances, compressing or deflecting the biasing element or springs to a fully flat condition can cause the biasing element or springs to set or deform, thereby permanently damaging the biasing elements.

Thus, in the above configurations, a torque applied to a packing nut or packing stud may be limited to prevent excessive loading to a biasing element and/or a valve packing. However, during operation of a fluid valve, inadequate torque on a packing nut or packing stud can cause the packing nut and/or packing stud to loosen due to vibration and/or thermal cycles, which can cause a loss of loading on the packing material.

Additionally, fluid valves often employ Belleville springs or washers to impart packing stress to valve packing. Belleville springs are often stacked in series and adjacent springs are inverted relative to each other to achieve a height (e.g., a stack height) sufficient to maintain a desired (e.g., a predetermined) packing stress to the valve packing. However, Belleville springs, when inverted, often have a relatively small outside diameter leading to difficulties with handling, can result in complex stacking arrangements, and/or are highly stressed which can lead to permanent yielding.

Example methods and apparatus described herein facilitate assembly and/or reduce (e.g., eliminate) uncertainty when loading packing, which results in extended usable life of a valve packing. In some instances, example methods and apparatus disclosed herein enable precise control of packing stresses for live-load valve packings. More specifically, the example valve packing apparatus described herein include a load assembly that provides a desired or predetermined packing stress to a packing seal assembly based on a predetermined distance or deflection of a biasing element (e.g., a Belleville spring). The example loading apparatus described herein enable precise control of an amount of deflection of a biasing element. In particular, controlling the deflection of the biasing element to a predetermined position, the load assemblies may be adjusted to provide a substantially constant desired packing stress to a packing seal assembly. Additionally, the example methods and apparatus described herein enable a packing stress to be set or adjusted without causing a biasing element (e.g., a Belleville spring) to be fully compressed. Also, in some examples, precisely controlling packing stress can reduce a rate of packing material transfer to a valve stem and/or reduce friction between the packing seal and a valve stem or shaft, which can prolong a service life of the packing material (e.g., packing rings).

An example valve packing loading apparatus disclosed herein includes a guide (e.g., a spring guide) or plate follower (e.g., a packing flange) that provides a stop to control an amount of deflection of a load assembly (e.g., Belleville springs). For example, the guide prevents over compression and/or deflection of the biasing element and, thus, controls (e.g., limits) an amount of load (e.g., a maximum load) on a valve packing. In some examples, the guide engages a valve body (e.g., or a bonnet) or a packing follower to limit or prevent deflection of the biasing element beyond a predetermined deflection. In other words, the guide disclosed herein can prevent or restrict a biasing element (e.g., springs) from applying a packing stress to a packing seal assembly that is greater than a predetermined packing stress (e.g., a desired packing stress). In some such examples, when the guide is in engagement with the valve body or the packing follower, a torque of a packing stud can be adjusted (e.g., increased) without transferring additional load to the valve packing (i.e., because the valve body or the packing follower prevents or restricts further deflection of the biasing element when the guide is in engagement with the valve body or the packing follower). Some example valve packing loading apparatus disclosed herein provide a positive stop to prevent deflection or compression of the biasing element beyond a desired deflection (e.g., in a rectilinear direction) to prevent the valve packing from being subjected to a packing stress that is greater than a maximum desired packing stress that might otherwise occur if the biasing element is deflected to a position beyond a deflection position limited by the stop. Example methods and apparatus disclosed herein reduce (e.g., eliminate) inconsistent loading of a valve packing, thereby providing a more accurate and consistent (e.g., uniform) valve packing load to valve packing.

The example load apparatus disclosed herein enable precise control over a desired packing stress imparted to the seal assembly by enabling precise control of the amount of deflection of a biasing element. Such accurate control of the packing stress significantly improves operating performance of a valve packing and significantly reduces packing stress variability compared to known methods and apparatus to load valve packings such as those noted above.

FIG. 1 is a perspective view of a fluid valve 100 including an example load apparatus 102 constructed in accordance with teachings of this disclosure. The fluid valve 100 shown in FIG. 1 includes an actuator 103 operatively coupled to a valve body 104 via a mount 106. The fluid valve 100 includes flanges 108 to couple the valve body 104 to piping. The example fluid valve 100 is a quarter-turn, rotary ball valve. However, the load apparatus 102 can be implemented with other types of fluid control valves including linear valves (e.g., sliding stem valves), a valve plug type flow control member, rotary disk valves, and/or any other type of fluid control device that includes a valve packing.

Figure 2:
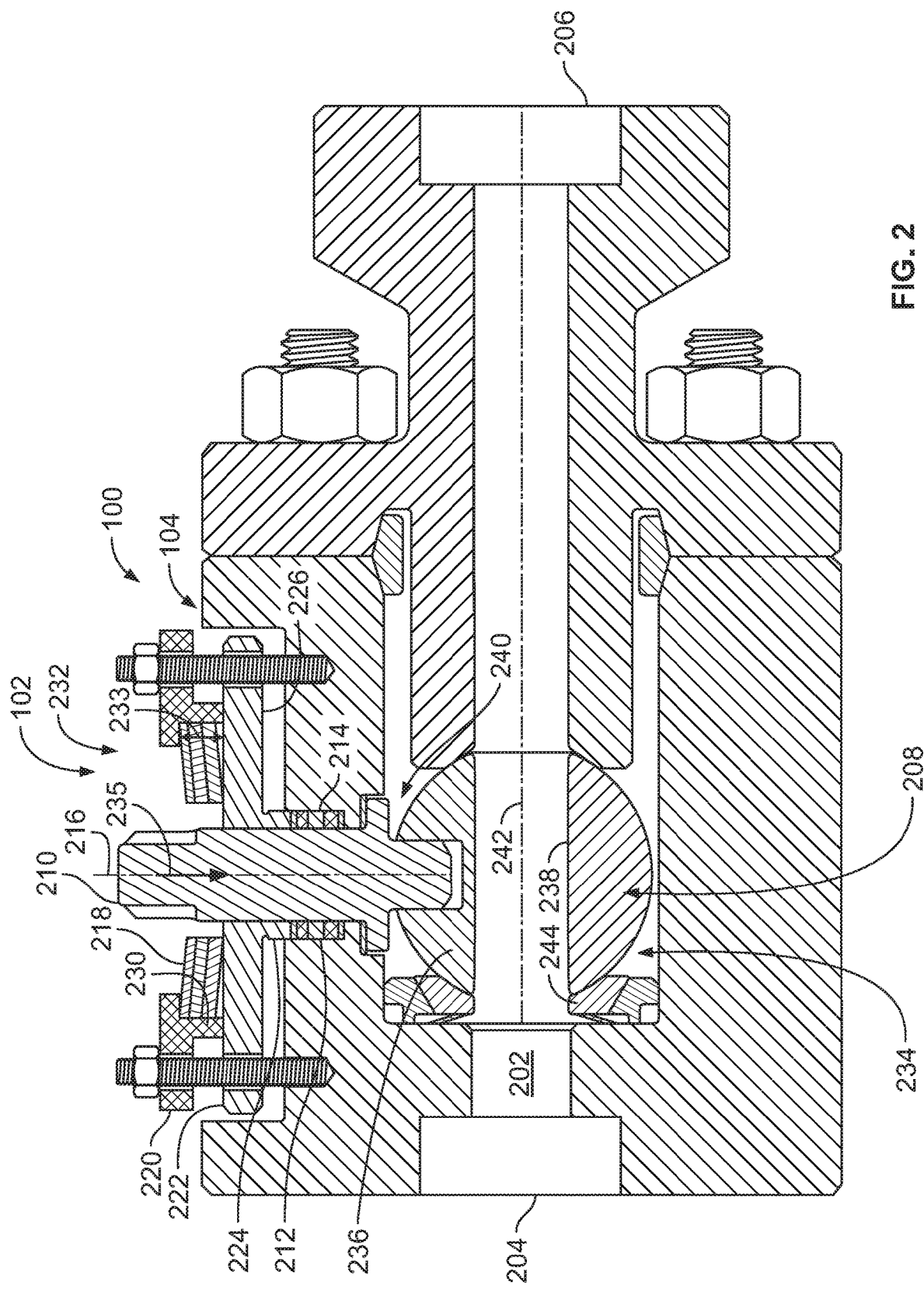
FIG. 2 is a cross-sectional view of the example fluid valve of FIG. 1.
Figure 7:
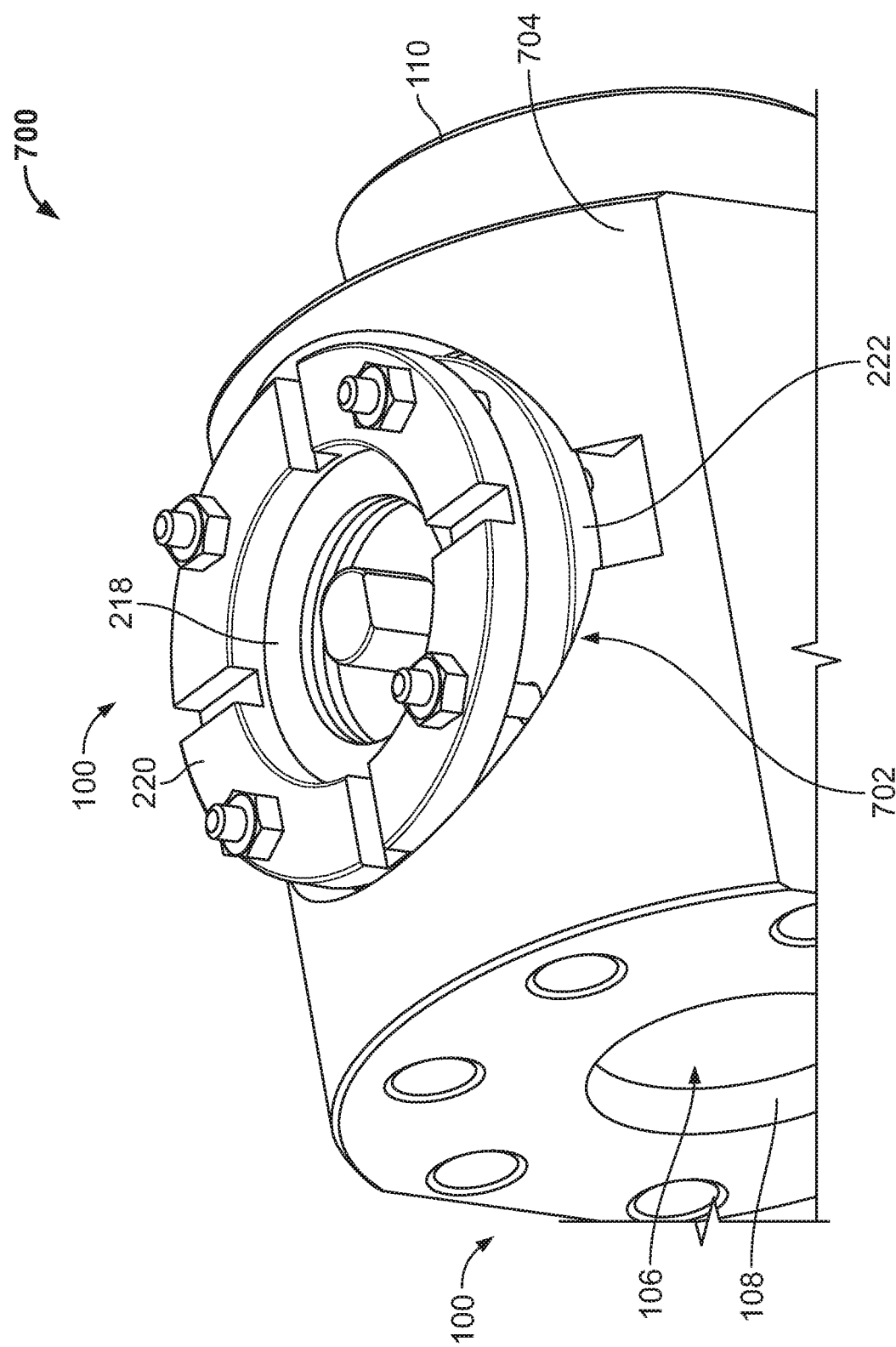
FIG. 7 is a perspective, partially assembled view of the example fluid valve of FIGS. 1-6.
Figure 8:
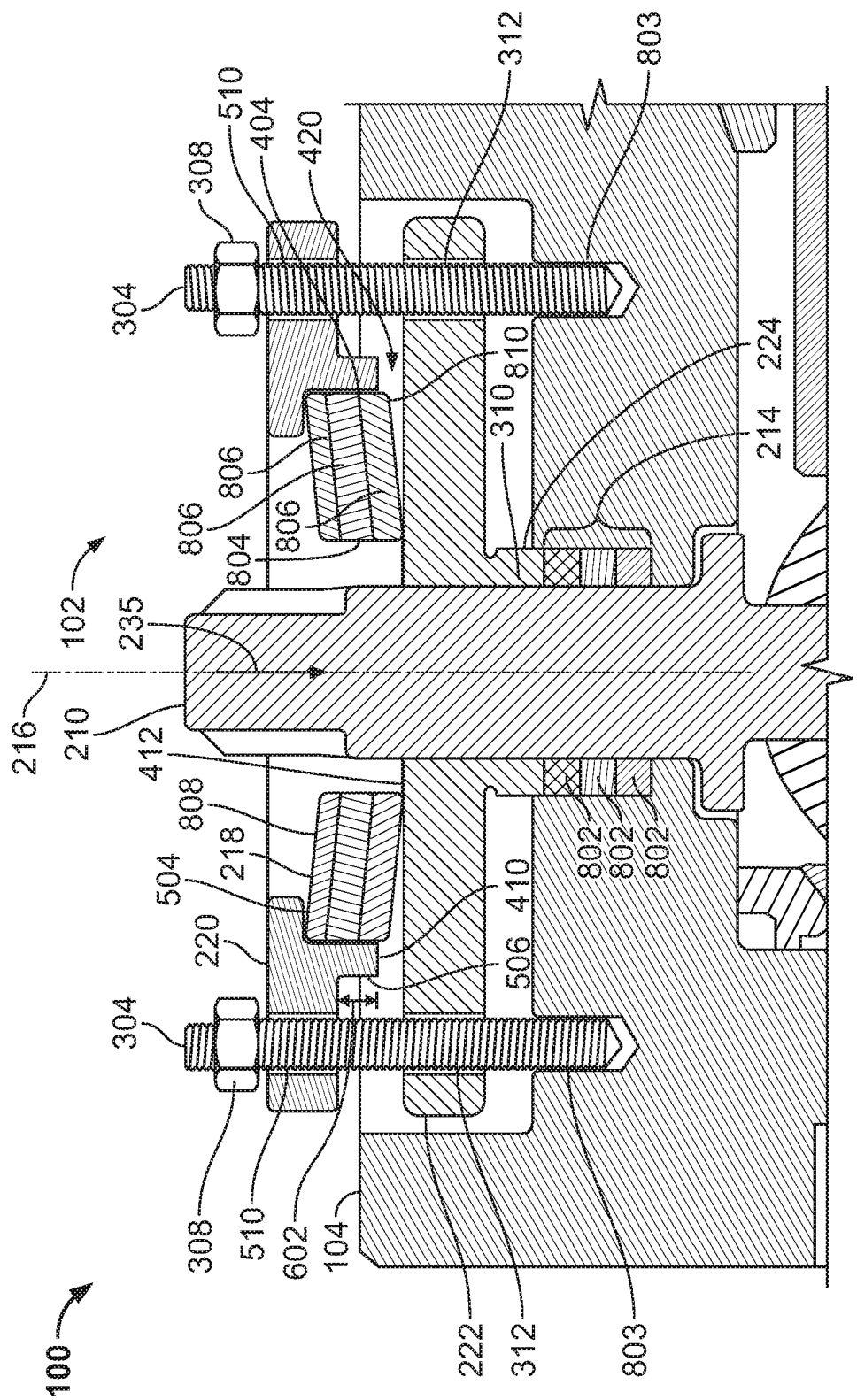
FIG. 8 is a partial, cross-sectional view of the example fluid valve of FIG. 7.
Figure 9:
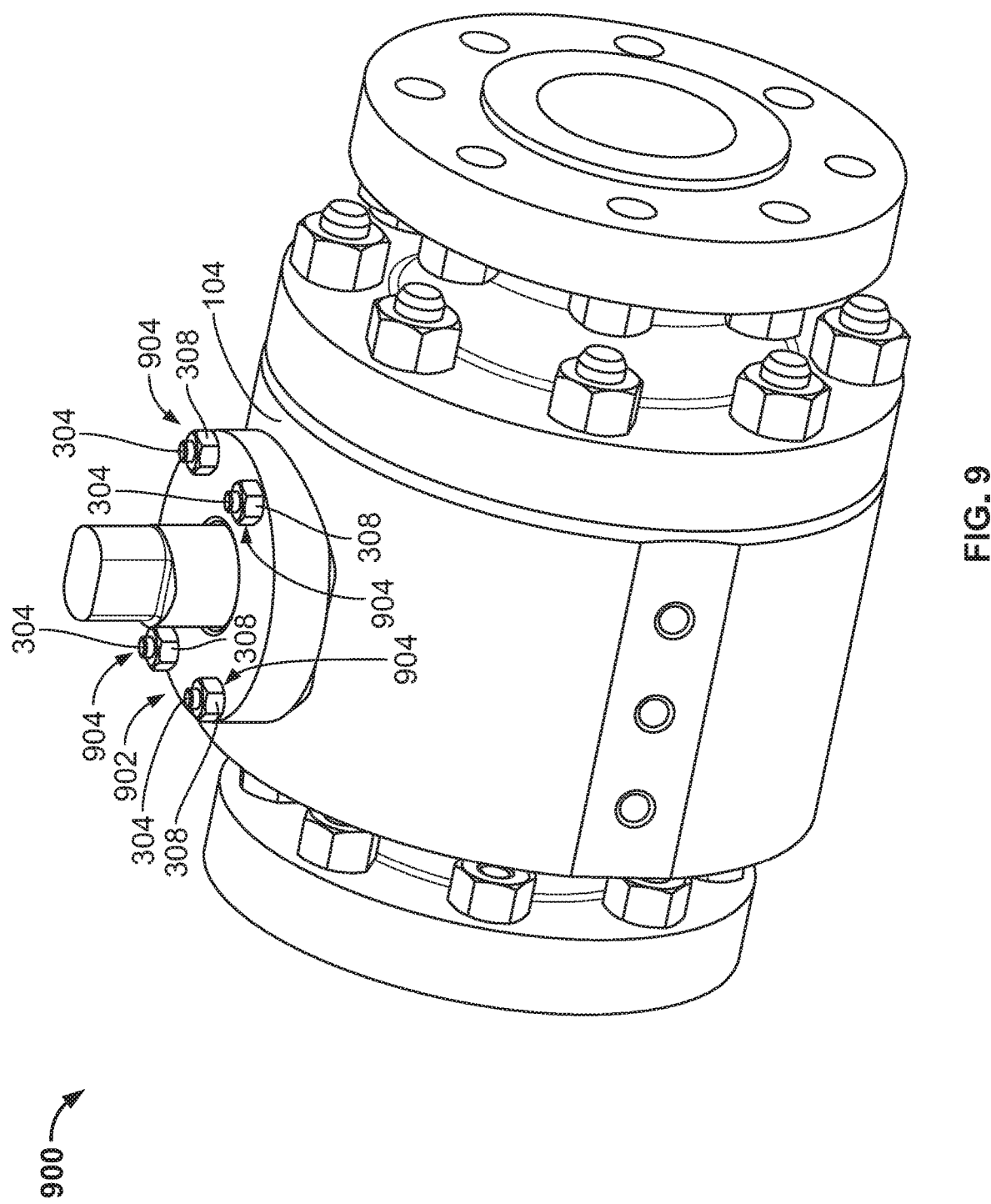
FIG. 9 is a perspective view of another example fluid valve having another example load apparatus disclosed herein.

FIG. 2 is a cross-sectional view of the valve body 104 of FIG. 1. The valve body 104 defines a fluid flow passageway 202 between an inlet 204 and an outlet 206. A flow control member 208 (e.g., a ball valve) is disposed within the fluid flow passageway 202 to control fluid flow through the fluid flow passageway 202 between the inlet 204 and the outlet 206. The flow control member 208 is operatively coupled to the actuator 103 (FIG. 1) via a shaft 210. The valve body 104 of the illustrated example includes a packing bore 212 to receive the shaft 210 and a valve packing 214. The valve packing 214 provides a seal to prevent leakage of process fluid past the shaft 210 and/or protects the environment against the emission of hazardous or polluting fluids. In particular, the valve packing 214 includes a packing material or seal assembly that surrounds the shaft 210 and is disposed within the packing bore 212 of the valve body 104. The packing material or seals can be composed of graphite, polytetrafluoroethylene (PTFE or Teflon®) and/or any other suitable material(s). For example, operating conditions (e.g., a temperature and/or a pressure of a process fluid) often determine the type of packing material to be used to provide an adequate seal for the particular process fluid or application. Some known packing materials such as, for example, graphite packing materials may be used in severe service conditions (e.g., process fluid temperatures greater than 450 F, pressures greater than 4,500 psig). However, such graphite packing materials may need to be precisely loaded with a proper packing stress or load to optimally function and/or provide a proper seal (e.g., a fluid tight seal). In some examples, the valve packing 214 can be a stack of ring-shaped structures including packing seals, packing rings, and/or a packing box ring. For example, the packing material or seals can be positioned between a packing ring and a packing box (e.g., as shown in FIGS. 7-9).

To load or provide a packing stress to the packing material to effectuate a packing seal that can oppose pressure of process fluid flowing through the fluid valve 100, the fluid valve 100 includes the load apparatus 102. Thus, the load apparatus 102 of the illustrated example provides (e.g., imparts) a packing stress to the valve packing 214. When a sufficient packing stress is imparted to the valve packing 214, the packing material of the valve packing 214 compresses axially (e.g., along a longitudinal axis 216 of the packing bore 212 in the orientation of FIG. 2) such that an inner surface of the valve packing 214 seals against the shaft 210 and an outer surface of the valve packing 214 seals against a surface of the packing bore 212 of the valve body 104. Axially loading the valve packing 214 about the longitudinal axis 216 causes the packing material of the valve packing 214 to expand radially (e.g., relative to the longitudinal axis 216) to effect a dynamic seal on the shaft 210 when the shaft moves or rotates and a static seal in the packing bore 212 where the packing material contacts the packing bore 212 (e.g., a surface defining the packing bore 212).

The load apparatus 102 of FIG. 2 includes a biasing element 218, a guide 220, and a packing follower 222. The biasing element 218 is positioned between the guide 220 and the packing follower 222. The biasing element 218 imparts a force or load to the valve packing 214 via the packing follower 222. Thus, the packing follower 222 transfers a packing load from the biasing element 218 to the valve packing 214. In the illustrated example, the packing follower 222 directly engages the valve packing 214. For example, the packing follower 222 includes a lip 224 (e.g., a cylindrical or annular lip or wall) projecting or extending from a body 226 that engages the valve packing 214 positioned in the packing bore 212. However, in some examples, an intermediate structure such as a secondary follower, a plate, a packing ring and/or any other structure can be positioned between the packing follower 222 and the valve packing 214.

The guide 220 controls an amount of deflection 233 (e.g., a maximum amount of deflection) of the biasing element 218 in an axial direction (e.g., in a direction along the longitudinal axis 216). Specifically, the guide 220 limits an amount of deflection of the biasing element 218 to prevent the packing follower 222 from imparting a packing stress that is greater than a desired packing stress (e.g., a packing stress that can reduce valve performance and/or reduce packing material operating life). To limit the amount of deflection, the guide 220 includes a stop 230. The stop 230 (e.g., a first body) of the guide 220 engages (e.g., directly contacts) the packing follower 222 (e.g., a second body) to provide a positive stop and limit (e.g., prevent) further deflection of the biasing element 218 in a first rectilinear direction 235 along the longitudinal axis 216. In other words, when the stop 230 engages the packing follower 222, the stop 230 is in an active state 232 to restrict movement of the guide 220 relative to the packing follower 222 in the first rectilinear direction 235 (i.e., toward the packing follower 222). In this manner, the biasing element 218 cannot be deflected or compressed further in a direction along the longitudinal axis 216 when the stop 230 is in the active state 232. Thus, the load apparatus 102 (e.g., via the stop 230) enables precise control over a desired packing stress imparted to the valve packing 214 by enabling precise control of the amount of deflection 233 of the biasing element 218. Such accurate control of the packing stress significantly improves operating performance of the valve packing 214 and significantly reduces packing stress variability compared to known methods and apparatus often used to load valve packings. The load apparatus 102 is discussed in greater detail in connection with FIGS. 3-8.

In operation, the actuator 103 (FIG. 1) rotates the flow control member 208 via the shaft 210 between a first rotational position about the longitudinal axis 216 to move the flow control member 208 to an open position 234 (e.g., as shown in FIG. 2) and a second rotational position opposite the first rotational position to move the flow control member 208 to a closed position (e.g., a quarter-turn valve). The flow control member 208 has a spherical body 236 that includes an aperture 238 (e.g. a through hole or central passageway) that aligns with the fluid flow passageway 202 when the flow control member 208 is in the open position 234 to fluidly couple the inlet 204 and the outlet 206 and allow fluid flow through the valve body 104. To move the flow control member 208 to the closed position, the actuator 103 rotates the flow control member 208 via the shaft 210 to the second rotational position to move the aperture 238 out of alignment or fluid communication with the fluid flow passageway 202 (e.g., such that a longitudinal axis 242 of the aperture 238 projects into the paper of FIG. 2) and the spherical body 236 engages a seal ring 244 positioned in the fluid flow passageway 202 to prevent or restrict fluid flow through the fluid flow passageway 202 between the inlet 204 and the outlet 206.

Figure 4:
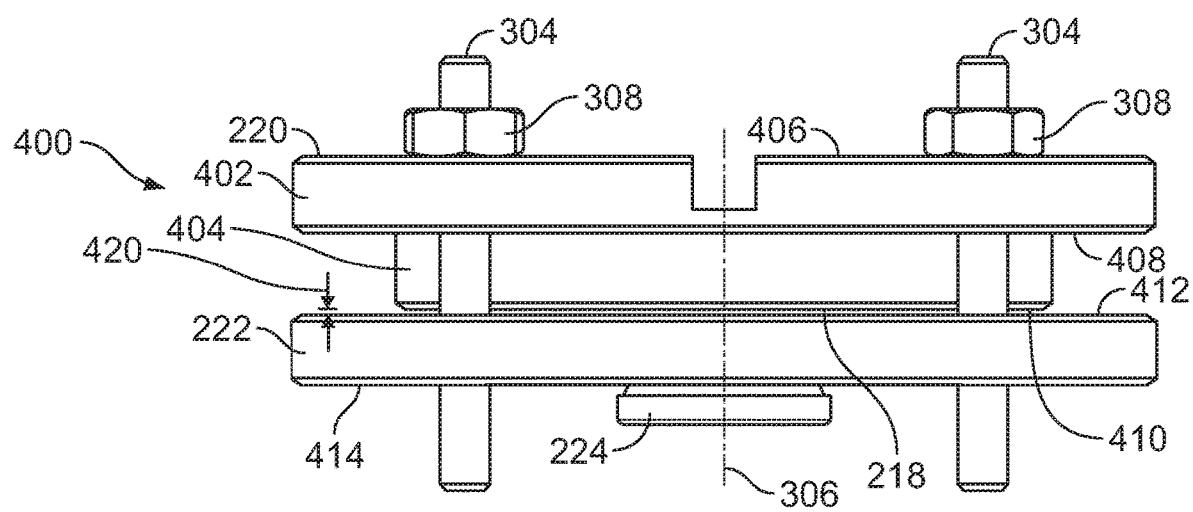
FIG. 4 is a side view of the example load apparatus of FIGS. 1-3.

During operation, the valve packing 214 seals the packing bore 212 and the shaft 210 and opposes pressure of a process fluid flowing through the fluid flow passageway 202 and/or within a cavity 240 of the valve body 104. Over the lifetime of the valve packing 214, the packing material of the valve packing 214 can wear and cause reduction of an overall height of the valve packing 214. As the packing material wears, the biasing element 218 imparts a force to the packing follower 222 to cause the packing follower 222 to move in the first rectilinear direction 235 toward the valve packing 214 to impart a load to the packing material and effect a packing seal. As a result, the packing follower 222 moves away from the guide 220 causing the stop 230 to move to a non-active state 400 (FIG. 4). During maintenance or inspection, the guide 220 can be adjusted via one or more fasteners 302 toward the packing follower 222 until the stop 230 is in the active state 232 (i.e., the stop 230 engages the packing follower 222). Thus, the load apparatus 102 of FIGS. 1 and 2 enables adjustment of a packing stress.

Figure 3:
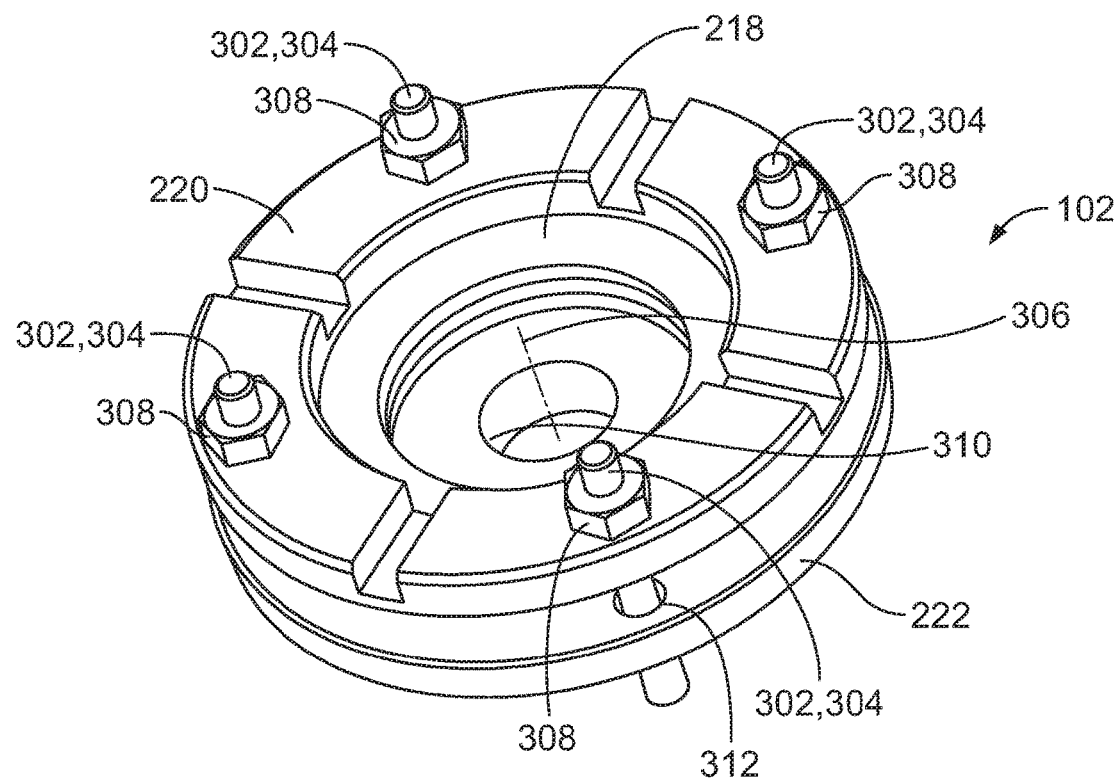
FIG. 3 is a perspective view of the example load apparatus of FIGS. 1 and 2.

FIG. 3 is a perspective view of the load apparatus 102 of FIGS. 1 and 2. The guide 220 is movably coupled to the packing follower 222 via the fasteners 302. Specifically, the guide 220 is coupled to the packing follower 222 via a plurality of packing studs 304. The packing studs 304 are radially spaced relative to a longitudinal axis 306 of the guide 220. The load apparatus 102 includes packing nuts 308 that couple to respective ones of the packing studs 304. The fasteners 302 couple the guide 220 to the valve body 104. In this example, the load apparatus 102 includes four packing studs and four packing nuts. However, in some examples, the load apparatus 102 can include more than four packing studs and packing nuts (e.g., six or eight packing studs and packing nuts) or less than four packing studs or packing nuts (e.g. two packing studs or packing nuts). The packing follower 222 includes a central opening 310 (e.g., a first aperture) to receive the shaft 210. In some examples, the central opening 310 can include a bearing or bushing to facilitate rotation of the shaft 210.

Additionally, the packing follower 222 is structured to move (e.g., slide in a direction along the longitudinal axis 306) relative to the guide 220 and/or the valve body 104 along the fasteners 302 when the guide 220 and the packing follower 222 are coupled to the valve body 104. To enable the packing follower 222 to move (e.g. slide) relative to the guide 220 and/or the valve body 104, the packing follower 222 includes one or more apertures 312 (e.g., non-threaded apertures) radially spaced about the longitudinal axis 306 to slidably receive respective ones of the fasteners 302. To enable the packing follower 222 to move or slide relative to the fasteners 302 (e.g., the packing studs 304), each aperture 312 of the packing follower 222 has a dimension (e.g., a diameter) that is greater than a size (e.g., an outer diameter) of a fastener 302 (e.g., the packing studs 304). The packing follower 222 of the illustrated example includes a plurality of apertures (e.g., non-threaded apertures) that align and/or slidably receive respective ones of the packing studs 304.

FIG. 4 is a side view of the load apparatus 102 of FIGS. 1-3 showing the stop 230 in the non-active state 400. The guide 220 (e.g., a first body, a cylindrical body) includes a flange 402 and a wall 404. The flange 402 defines a first surface 406 (e.g., an upper surface) and a second surface 408 (e.g., a lower surface) opposite the first surface 406. The wall 404 protrudes from the flange 402. For example, the wall 404 protrudes from the second surface 408 in a direction along the longitudinal axis 306 toward the packing follower 222. The wall 404 defines the stop 230 of the guide 220. Specifically, an end 410 of the wall 404 defines the stop 230. As noted above, the stop 230 limits movement of the guide 220 relative to the packing follower 222 in the first rectilinear direction when the stop 230 engages the packing follower 222. For example, the stop 230 engages a first surface 412 of the packing follower 222 that is oriented toward the stop 230 to prevent further deflection of the biasing element 218 when the stop 230 is in the active state 232 (FIG. 2).

In the non-active state 400, the stop 230 does not (e.g., directly) engage the packing follower 222 such that the guide 220 is spaced from the packing follower 222 by a gap 420. For example, in the non-active state 400, the end 410 of the wall 404 is separated or spaced from the first surface 412 of the packing follower 222 by the gap 420. Although the guide 220 is spaced from the packing follower 222, the biasing element 218 supported by the guide 220 engages the packing follower 222 (e.g., directly engages the first surface 412 of the packing follower 222). The guide 220 can move relative to the packing follower 222 in the first rectilinear direction when the stop 230 is in the non-active state 400. The lip 224 of the packing follower 222 is a cylindrical body that protrudes from a second surface 414 of the packing follower 222 opposite the first surface 412. An end of the lip 224 engages the valve packing 214 and transfers a load from the biasing element 218 to the valve packing 214.

Figure 5:
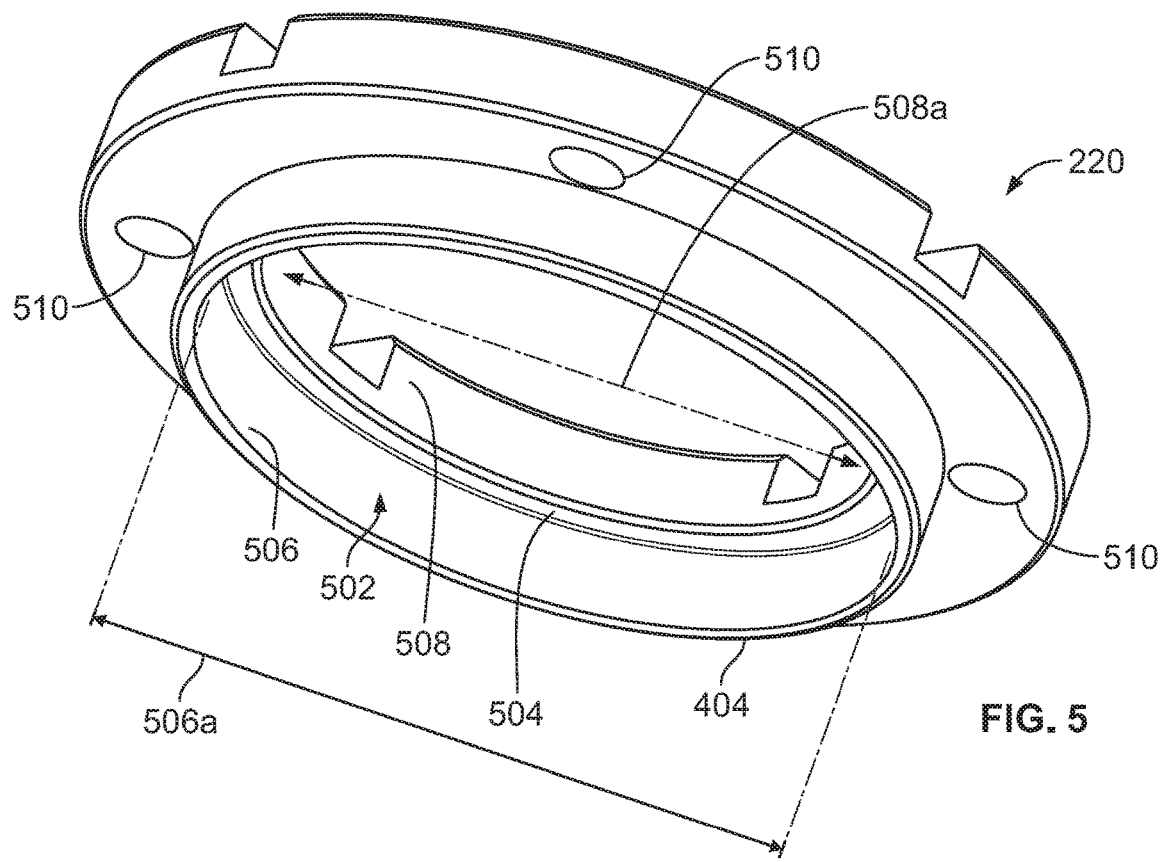
FIG. 5 is a perspective view of an example guide of the example load apparatus of FIGS. 1-4.

FIG. 5 is a perspective view of the guide 220 of FIGS. 1-4. The guide 220 includes a cavity 502 to receive the biasing element 218. Specifically, the wall 404, a shoulder 504 and a first opening 506 define the cavity 502 of the guide 220. The shoulder 504 is positioned in the cavity 502 to provide a spring seat (e.g., a support) for the biasing element 218. To define the shoulder 504, the guide 220 has a stepped inner profile formed by the first opening 506 and a second opening 508. To provide the stepped profile, the first opening 506 has a first dimension 506a (e.g., a first diameter) that is greater than a second dimension 508a of the second opening 508 (e.g., a second diameter). The flange 402 includes a plurality of apertures 510 (e.g., non-threaded apertures) radially spaced relative to the longitudinal axis 306 to receive the respective ones of the packing studs 304.

Figure 6:
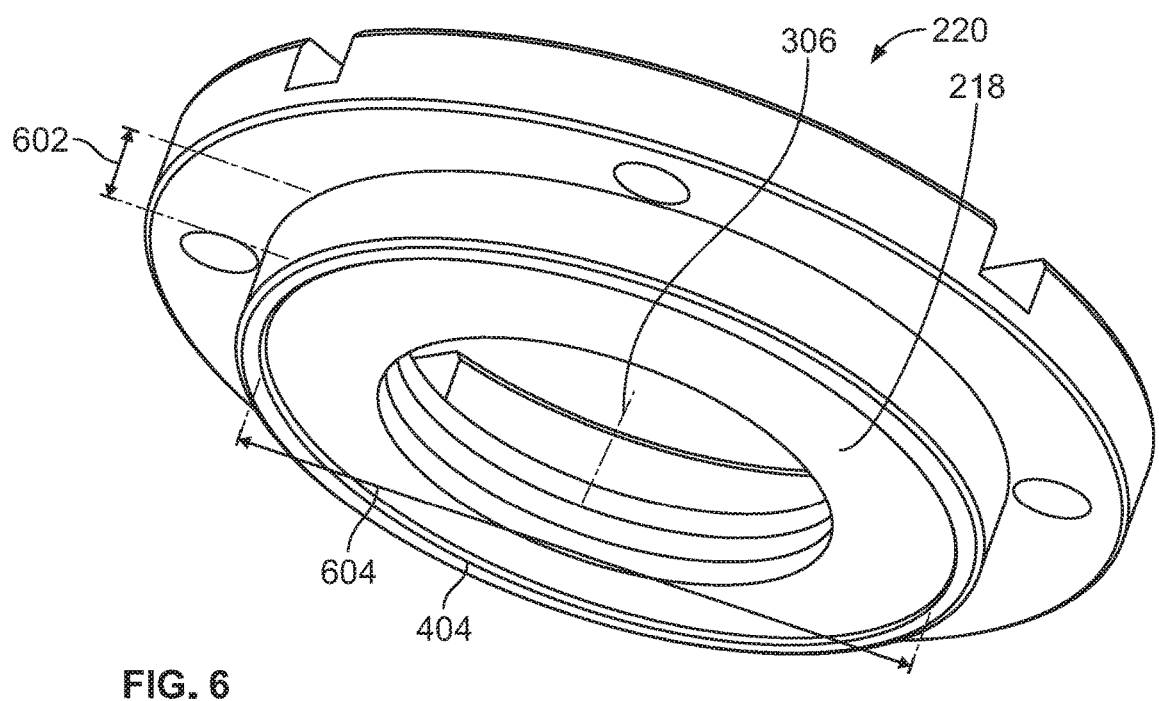
FIG. 6 is a perspective view of the example guide of FIGS. 1-4 shown with an example biasing element coupled thereto.

FIG. 6 is a perspective view of the guide 220 and the biasing element 218 of FIGS. 1-6. As shown in FIG. 6, the biasing element 218 is positioned in the cavity 502 (FIG. 5). Specifically, the biasing element 218 nests in the guide 220. In other words, the wall 404 surrounds a lateral or side surface of the biasing element 218. Further, the first dimension 506a (e.g., an inside diameter of the wall 404) locates and/or positions the biasing element 218 relative to the longitudinal axis 306 and maintains a proper centerline position of the biasing element 218 (e.g., a stacked spring arrangement) relative to the shaft 210 when the load apparatus 102 is coupled to the valve body 104. An amount of deflection or load to be provided to the valve packing 214 can be pre-determined based on a first dimension 602 (e.g., a length) of the wall 404 and/or a first dimension 604 (e.g., a diameter) of the biasing element 218. For example, the greater the first dimension 602 of the wall, the lesser the amount of deflection 233 in the first rectilinear direction 235 allowed by the guide 220 and the lesser the first dimension 602, the greater the amount of deflection 229. Additionally, the greater the first dimension 604 of the biasing element 218, the greater the load that the biasing element 218 is capable of generating. Such dimensional considerations can be configured during a design process of the fluid valve 100 to suit a particular application.

FIG. 7 is a perspective view of the fluid valve 100 of FIGS. 1-6 shown in a partially assembled condition 700. Specifically, the actuator 103 and the mount 106 are not shown in FIG. 7. The valve body 104 includes a recessed portion 702 on an outer surface 704 that allows access to the stop 230 when the load apparatus 102 is coupled to the valve body 104. In this manner, a position of the guide 220 relative to the packing follower 222 can be inspected. For example, the access enables visual inspection of the stop 230 relative to the packing follower 222. In some examples, the recessed portion 702 enables a tool (e.g., a feeler gauge) to access an area between the guide 220 and the packing follower 222 to measure the gap 420 (FIG. 4) and/or determine if the gap 420 is present. In some examples, the mount 106 (FIG. 1) can include an access (e.g., slot) aligned with the recessed portion 702 to facilitate visual inspection and/or insertion of the tool when the fluid valve 100 is in a fully assembled state as shown in FIG. 1. Thus, the gap 420 can be detected at the factory (e.g., during assembly of the fluid valve 100) and/or in the field. Elimination of the gap 420 (e.g., a zero distance) between the guide 220 (e.g., the stop 230) and the packing follower 222 provides visual confirmation that the biasing element 218 is in a desired deflected position and provides a sufficient packing stress to the valve packing 214.

FIG. 8 is an enlarged, partial cross-sectional view of the fluid valve 100 of FIG. 7. To couple the load apparatus 102 to the valve body 104, the packing follower 222 is coupled to the valve body 104. For example, the shaft 210 is received by the central aperture 310 of the packing follower 222 and the apertures 312 slidably receive respective ones of the packing studs 304. The valve body 104 includes threaded bores 803 to threadably receive the packing studs 304. The packing studs 304 can be threaded to the valve body 104 prior to coupling of the packing follower 222 to the valve body 104. Thus, the apertures 312 of the packing follower 222 align with respective ones of the threaded bores 803 of the valve body 104 and the central aperture 310 coaxially aligns with the longitudinal axis 216. Additionally, the packing studs 304 can be sized to provide a specified bolt stress when coupled to the valve body 104 to prevent the packing studs 304 and/or the packing nuts 308 from loosening due to vibration and/or thermal cycles. Thus, the packing studs 304 and/or the packing nuts 308 can be set a predetermined torque needed to provide the bolt stress that prevents the packing studs 304 from loosening due to vibration and/or thermal cycles. When the packing follower 222 is coupled to the valve body 104, the lip 224 of the packing follower 222 engages the valve packing 214. Specifically, the valve packing 214 includes a plurality of packing rings 802. In some instances, each of the packing rings 802 can be preloaded or prestressed prior to coupling the packing follower 222 to the valve body 104.

After the packing follower 222 is coupled to the valve body 104, the biasing element 218 is positioned on the first surface 412 of the packing follower 222. The biasing element 218 includes a central opening 804 that receives the shaft 210. The biasing element 218 of the illustrated example includes a plurality of Belleville springs 806. In general, a Belleville spring provides a relatively high packing stress relative to the travel or deflection imparted on the Belleville spring. In other words, a Bellville spring has a relatively high spring constant and, thus, a small or relatively low deflection or compression of a Belleville spring provides a relatively high packing stress or force. Typically, Belleville springs may be used to provide a relatively large loading force or packing stress to compress packing materials that are used in severe service conditions (e.g., high pressure applications). Belleville springs typically need to be precisely compressed or deflected to provide a desired packing stress. Otherwise, if the packing stress provided is too high, high packing friction may result, which can reduce valve performance and/or reduce packing material operating life. Additionally, a packing stress that is relatively high or greater than a maximum desired packing stress may cause a significant amount of packing materials such as graphite packing materials to transfer material to a valve stem, which may cause an improper seal or premature failure. In other words, controlling an amount of packing stress imparted to the packing material can control or influence a transfer rate or deposition rate of the packing material onto a shaft.

Additionally, the Belleville springs 806 of the illustrated example are stacked in parallel. As used herein, stacking the Belleville springs 806 in parallel means that the Belleville springs 806 are oriented in the same orientation such that a surface area of a first Belleville spring is in substantial contact with a surface area of an adjacent Belleville spring. In contrast, Belleville springs stacked in series means that the Belleville springs are oriented such that a first Belleville spring is in an opposite orientation (e.g., inverted) relative to an adjacent Belleville spring causing a smaller amount of surface area contact between the adjacent Belleville springs (e.g., a line of contact between Belleville springs stacked in series can be along an inner diameter or an outer diameter of the Belleville springs in contact). Although orienting the Belleville springs in series provides a greater amount of deflection between the Belleville springs, arranging the Belleville springs 806 in the same orientation (i.e., in parallel) provide a load greater than a single Belleville spring in a series orientation. In other words, a larger diameter Belleville spring stacked in parallel with a large free height can provide a similar load as a smaller diameter Belleville spring stacked in series with a smaller free height. For example, a smaller diameter Belleville spring includes a central opening having a diameter to fit over a packing stud (e.g., the packing studs 304 of FIG. 1). Belleville springs having larger diameters facilitate handling of the Belleville springs during assembly and/or maintenance. Thus, the example load apparatus 102 enables a more compact product (e.g., in a direction along the longitudinal axis 216) and facilitates assembly and maintenance.

The guide 220 is coupled to the valve body 104 via the packing studs 304. The guide 220 (e.g., the first dimension 506a or the inner diameter of the wall 404) positions the biasing element 218 and/or maintains proper centerline position of the biasing element 218 relative to the longitudinal axis 216. For example, an outermost lateral surface of the biasing element 218 engages an inner surface of the wall 404. Thus, a central axis of the biasing element 218 is coaxially located or positioned relative to the longitudinal axis 216 via the guide 220. The longitudinal axis 306 of the guide 220 coaxially aligns with the longitudinal axis 216 when the guide 220 is coupled to the valve body 104. Additionally, the apertures 510 align with respective ones of the apertures 312 and the threaded bores 803 and receive respective ones of the packing studs 304. The biasing element 218 (e.g., the Belleville springs 806) is positioned (e.g., stacked in parallel) is received in the cavity 502 (FIG. 5) and positioned between the guide 220 and the packing follower 222. Specifically, a first end 808 of the biasing element 218 engages the shoulder 504 (e.g. located within the cavity 502) of the guide 220 and a second end 810 opposite the first end 808 engages the first surface 412 of the packing follower 222. In some examples, the biasing element 218 can be positioned in the cavity 502 of the guide 220 prior to coupling to the valve body 104.

The guide 220 provides precise control of the deflection of the Belleville springs 806. To control the deflection of the biasing element 218, the packing nuts 308 are tightened on the packing studs 304. The packing nuts 308 adjustably drive or urge the biasing element 218 against the packing follower 222 which, in turn, axially compresses the valve packing 214 to provide a seal and prevent leakage of process fluid past the shaft 210. As the packing nuts 308 are tightened on the packing studs 304, the guide 220 moves (e.g., is drawn down) in the first rectilinear direction 235 to deflect (e.g., compress) the biasing element 218. The packing nuts 308 are adjusted (e.g., rotated or tightened on the packing studs 304) until the stop 230 of the guide 220 engages (e.g., directly contacts) the first surface 412 of the packing follower 222. The guide 220 consistently controls an amount of deflection of the biasing element 218 to provide consistent loading of the valve packing 214. The biasing element 218 deflects or compresses as the packing nuts 308 are tightened to provide a packing stress (e.g., an axial load) to the valve packing 214 via the packing follower 222. Specifically, the stop 230 provides a visual indication when the packing nuts 308 are properly located to provide a predetermined load to the valve packing 214. For example, when the stop 230 engages the packing follower 222, the packing nuts 308 do not need further rotation and/or do not need further tightening. When the gap 420 between the stop 230 and the packing follower 222 is eliminated, the biasing element 218 is properly deflected and the lip 224 of the packing follower 222 transmits a packing stress to the valve packing 214. Thus, the stop 230 engages the packing follower 222 to mechanically stop the biasing element 218 from applying a load to the valve packing 214 that is greater than a predetermined load (e.g., a maximum or nominal load).

In this example, the Belleville springs 806 provide a uniform load to the packing material of the valve packing 214 and maintain such a uniform packing load during valve operation (e.g., valve stroking). In other words, the Belleville springs 806 provide a substantially constant load to the packing follower 222 to exert a substantially constant compressive force on the valve packing 214. If the valve packing 214 consolidates (e.g., due to wear), the Belleville springs 806 decompress to move the packing follower 222 in the first rectilinear direction 235 to maintain a compressive force the valve packing 214 and thereby maintain the seal integrity of the valve packing 214.

For example, during operation, wear of the valve packing 214 may cause the packing follower 222 to move away from the guide 220 in the first rectilinear direction 235, thereby causing the gap 420 to form between the first surface 412 of the packing follower 222 and the stop 230 due to the Belleville springs 806 decompressing and continuing to provide a substantially constant load to the valve packing 214. During maintenance, the packing nuts 308 can be tightened so that the stop 230 engages the first surface 412 of the packing follower 222. Thus, the stop 230 can be adjusted (e.g., eliminated) at the factory and/or adjusted in the field. Therefore, if a valve packing leakage occurs after the guide 220 has been seated against the packing follower 222, the packing nuts 308 can be tightened to transmit additional load to the valve packing 214 to stop leakage through the valve packing 214.

FIG. 9 illustrates an example fluid valve 900 that has another example load apparatus 902 disclosed herein. Those components of the example fluid valve 900 of FIG. 9 that are substantially similar or identical to those components of the example fluid valve 900 described above and that have functions substantially similar or identical to the functions of those components will not be described in detail again below. Instead, the interested reader is referred to the above corresponding descriptions in connection with FIGS. 1-8. Those components that are substantially similar or identical will be referenced with the same reference numbers as those components described in connection with FIGS. 1-8. For example, the fluid valve 900 includes a valve body 104 defining a fluid flow passageway 202 between an inlet 204 and an outlet 206. A flow control member 208 is positioned in the fluid flow passageway 202 and is operatively coupled an actuator via a shaft 210. The load apparatus 902 of FIG. 9 is coupled to the valve body 104 via one or more fasteners 904. Specifically, the fasteners 904 of the illustrated example include the packing studs 304 and the packing nuts 308.

Figure 10:
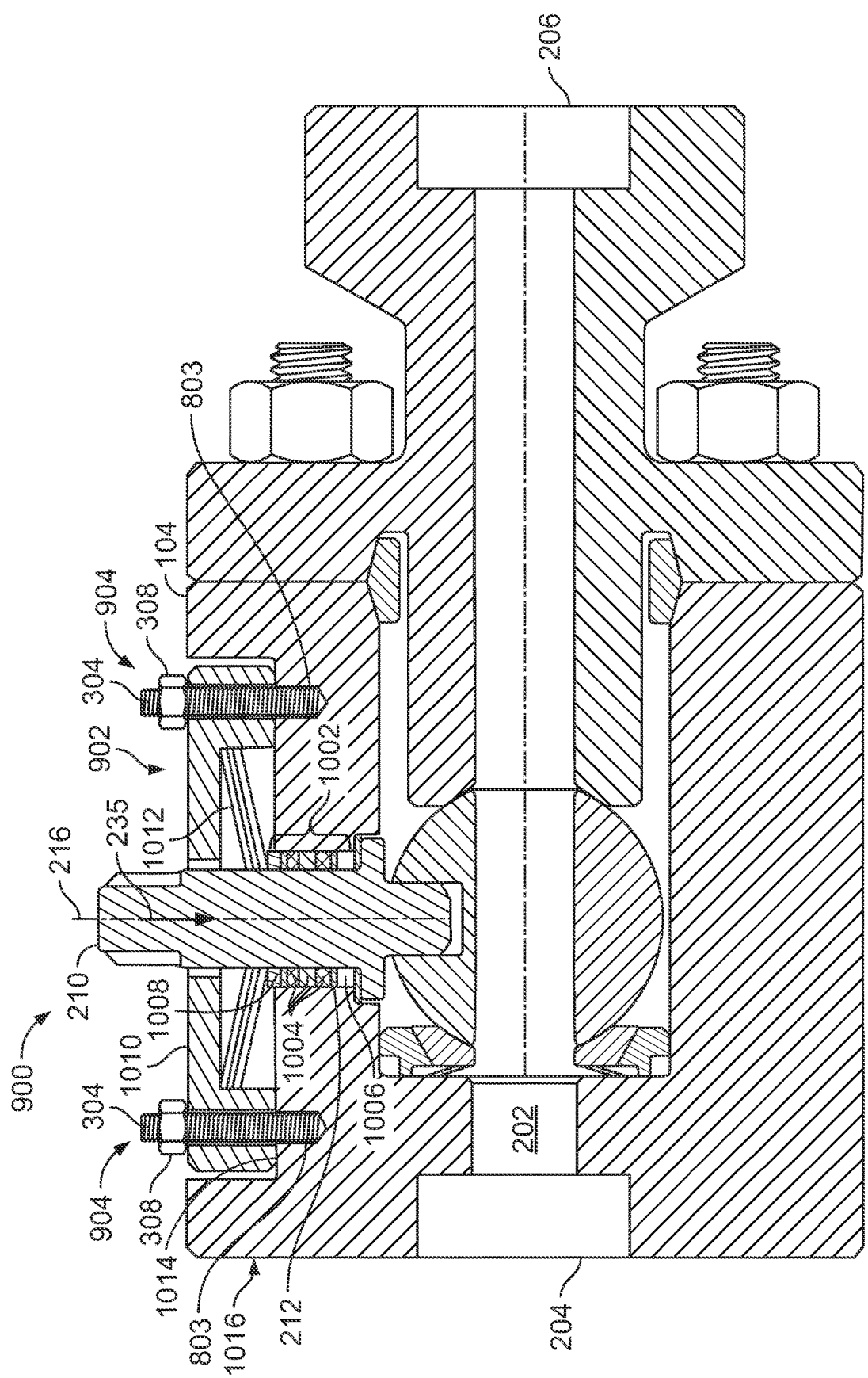
FIG. 10 is a cross-sectional view of the example fluid valve of FIG. 9.

FIG. 10 is a cross-sectional view of the fluid valve 900 of FIG. 9. The load assembly 902 of FIG. 9 provides a packing stress to a valve packing 1002 positioned in a packing bore 212 of the valve body 104. The valve packing 1002 of FIG. 10 includes packing rings 1004 positioned between a packing box 1006 and a packing ring retainer 1008. The load apparatus 902 includes a guide 1010 to retain or receive a biasing element 1012. The load apparatus 902 is removably coupled to the valve body 104 via the packing studs 304 and the packing nuts 308. To control an amount of deflection of the biasing element 1012 and/or a packing stress applied to the valve packing 1002, the guide 1010 includes a stop 1014. In an active state 1016 as shown in FIG. 10, the stop 1014 engages the valve body 104 to limit an amount of deflection of the biasing element 1012 in the first rectilinear direction 235 and, thus, an amount of packing stress to be imparted on the valve packing 1002. In other words, in the active state 1016, a gap 1210 (FIG. 12) between the stop 1014 and the valve body 104 is eliminated. The valve body 104 includes the threaded bores 803 to threadably receive the packing studs 304.

Figure 11A:
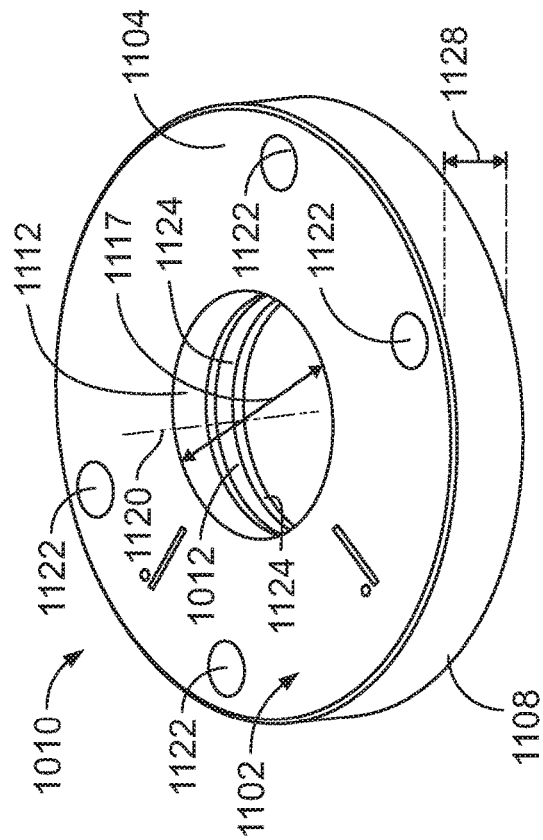
FIGS. 11A and 11B are perspective views of an example guide and an example biasing element of the example load apparatus of FIGS. 9-10.
Figure 11B:
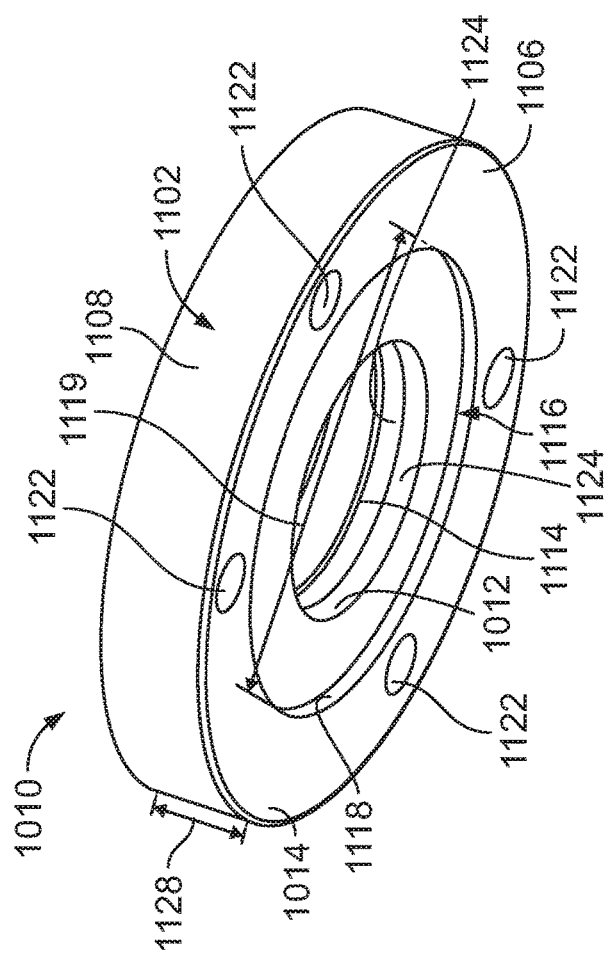

FIG. 11A is a perspective, top view of the guide 1010 of FIGS. 9 and 10. FIG. 11B is a perspective, bottom view of the guide 1010 of FIGS. 9 and 10. Referring to FIGS. 11A and 11B, the guide 1010 includes a body 1102 that is a unitary piece or structure having a first surface 1104 (e.g., an upper surface) and a second surface 1106 (e.g., a lower surface) opposite the first surface 1104. The body 1102 defines a wall 1108 (e.g., an annular wall) that protrudes from the first surface 1104 (e.g., a flange) of the body 1102. The body 1102 defines a central aperture 1112 to receive the shaft 210 when the guide 1010 is coupled to the valve body 104. The central aperture 1112 coaxially aligns with the longitudinal axis 216 of the packing bore when the guide 1010 is coupled to the valve body 104. The central aperture 1112 includes a stepped profile to define a shoulder 1114 and a cavity 1116. Thus, the central aperture 1112 includes a first dimension 1117 (e.g., a first diameter) adjacent the first surface 1104 and a second dimension 1119 (e.g., a second diameter) adjacent the second surface 1106. The second dimension 1119 is larger than the first dimension 1117. The shoulder 1114 is located in the cavity 1116 and is to provide a spring seat for the biasing element 1012 when the biasing element 1012 is positioned in the cavity 1116 of the guide 1010. The wall 1108 defines an inner surface 1118 oriented toward the cavity 1116 that is to engage an outer surface (e.g., an outermost surface or a lateral side) of the biasing element 1012 and is to centrally locate the biasing element 1012 relative to a longitudinal axis 1120 of the guide 1010. The body 1102 includes a plurality of apertures 1122 (e.g., non-threaded apertures) extending through the body 1102 between the first surface 1104 and the second surface 1106 and radially spaced relative to the longitudinal axis 1120 of the guide 1010 to receive (e.g., slidably receive) respective ones of the packing studs 304. Thus, the apertures 1122 align with the respective apertures 803 of the valve body 104 to receive the fasteners 904. The apertures 1122 extend through the wall 1108 between the first surface 1104 and the second surface 1106.

The biasing element 1012 of the illustrated example includes a plurality of Belleville springs 1124. The Belleville springs 1124 are stacked within the cavity 1116 in a parallel orientation. However, in some examples, the Belleville springs 1124 can be stacked in a series orientation. In some examples, the biasing element 1012 can be a wave spring, a coil spring and/or any other suitable biasing element(s).

The wall 1108 of the illustrated example defines the stop 1014 to limit an amount of deflection of the biasing element 1012 (e.g., the Belleville springs) in the first rectilinear direction 235. The stop 1014 is formed by an end of the wall 1108. For example, the second surface 1106 defines the stop 1014 of the example body 1102. A dimension 1128 (e.g., a length) of the wall 1108 and/or a dimension (e.g., an outer diameter) of the biasing element 1012 provides an indication of a predetermined load to be provided to the valve packing 1002. As described below, the stop 1014 also provides a mechanical stop to prevent the load apparatus 902 from applying a load to the valve packing 1002 that is greater than the predetermined load. For example, the predetermined load can correspond to a nominal packing stress to be provided to the valve packing 1002.

Figure 12:
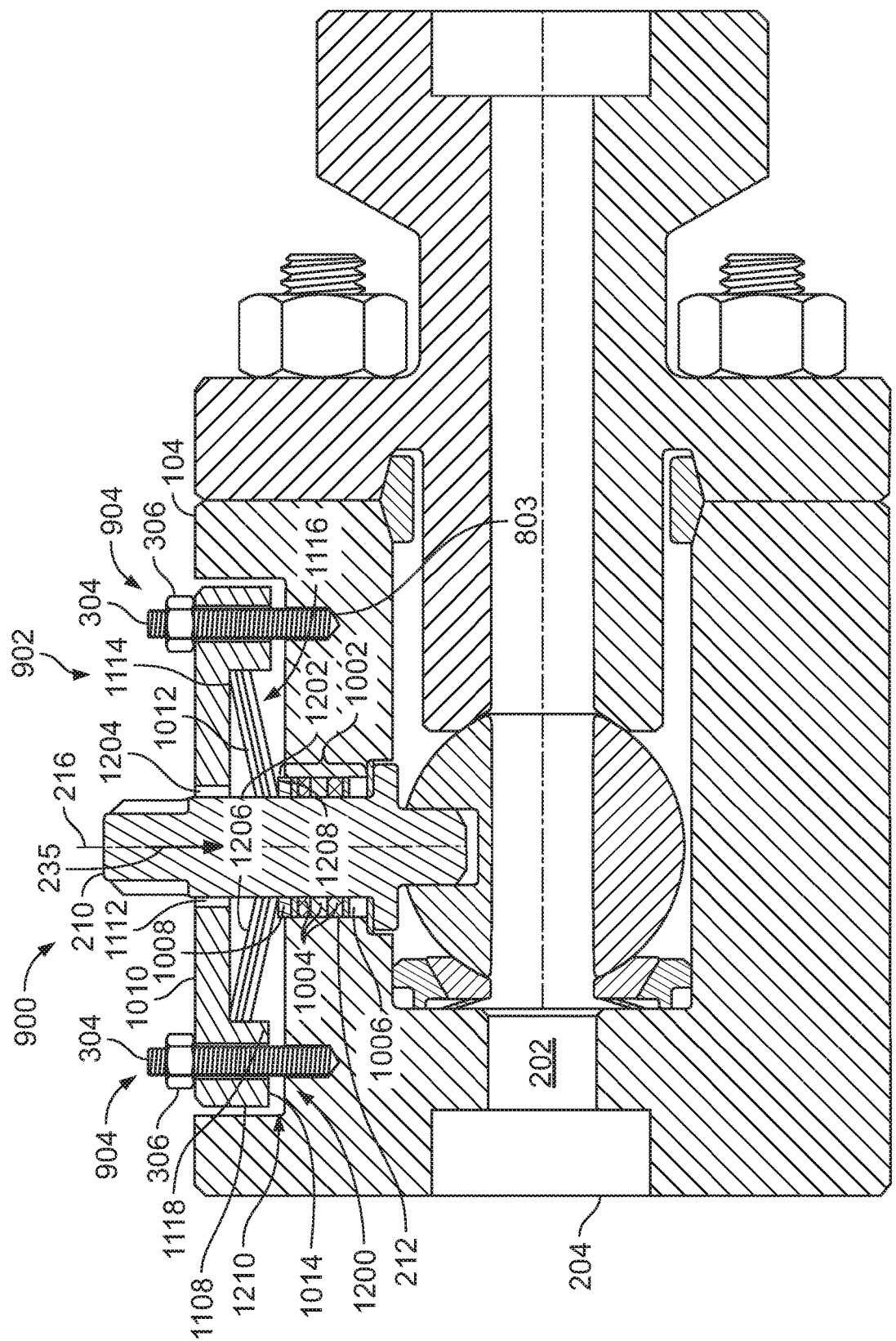
FIG. 12 is a partial, cross-sectional view of the example fluid valve of FIGS. 9, 10, 11A and 11B.

FIG. 12 is a perspective, partial cross-sectional view of the example fluid valve 900 of FIGS. 9, 10, 11A and 11B. The stop 1014 of FIG. 12 is shown in a non-active state 1200. To couple the load apparatus 902 to the valve body 104, the biasing element 1012 is positioned on the packing ring retainer 1008 of the valve packing 1002. The biasing element 1012 includes a central opening 1202 that receives the shaft 210. The guide 1010 is coupled to the valve body 104 via the packing studs 304. In some examples, the biasing element 1012 can be positioned in the cavity 1116 of the guide 1010 prior to coupling to the valve body 104. When the guide 1010 is coupled to the valve body 104, the guide 1010 positions the biasing element 1012 and/or maintains proper centerline position of the biasing element 1012 relative to the longitudinal axis 216. For example, an outermost lateral surface of the biasing element 1012 engages the inner surface 1118 of the wall 1108. Thus, a central axis of the biasing element 1012 is coaxially aligned with the longitudinal axis 216 via the guide 1010. Additionally, an inner surface of the biasing element 1012 is spaced from the shaft 210 and, thus, does not interfere with an operation (e.g., rotation) of the shaft 210. Additionally, a bearing 1204 is located in the central aperture 1112 of the guide 1010 to facilitate rotation of the shaft 210 during operation of the fluid valve 900.

The biasing element 1012 is received in the cavity 1116 (e.g., the Belleville springs 1124 are stacked in parallel) and positioned between the guide 1010 and the packing ring retainer 1008. Specifically, a first end 1206 of the biasing element 1012 engages the shoulder 1114 (e.g. a first body) of the guide 1010 and a second end 1208 opposite the first end 1206 engages packing ring retainer 1008 (e.g. a second body).

The guide 1010 provides precise control of an amount of deflection of the biasing element 1012 (e.g., the Belleville springs 1124) in the first rectilinear direction 235. To control the deflection of the biasing element 1012, the packing nuts 308 are tightened on the packing studs 304. The packing nuts 308 adjustably drive or urge the biasing element 1012 against the packing ring retainer 1008 which, in turn, axially compresses the valve packing 1002 to provide a seal and prevent leakage of process fluid past the shaft 210 and/or the packing bore 212. As the packing nuts 308 are tightened on the packing studs 304, the guide 1010 moves (e.g., is drawn down) in the first rectilinear direction 235 to deflect (e.g., compress) the biasing element 1012. The packing nuts 308 are adjusted (e.g., rotated or tightened on the packing studs 304) until the stop 1014 of the guide 1010 engages (e.g., directly contacts) the valve body 104 (e.g., the stop 1014 is in the active state 1016 of FIG. 10). The guide 1010 consistently controls an amount of deflection of the biasing element 1012 to provide consistent loading of the valve packing 1002. The biasing element 1012 deflects or compresses as the packing nuts 308 are tightened to provide a packing stress (e.g., an axial load) to the valve packing 1002. The packing nuts 308 are turned or tightened until the stop 1014 engages the valve body 104. When the stop 1014 engages (e.g., directly contacts) the valve body 104, a gap 1210 (e.g., a distance) between the stop 1014 (e.g., the second surface 1106) and the valve body 104 is eliminated. The biasing element 1012 is sufficiently deflected and transmits a packing stress to the valve packing 1002.

Additionally, after the stop 1014 is in the active state (FIG. 10), a packing torque on the packing nuts 308 can continue to increase without affecting a packing stress on the valve packing 1002. For example, to increase the packing torque, the packing nuts 308 can continue to be rotated or tightened on the packing studs 304. Because the stop 1014 engages the valve body 104 (e.g., has gone solid with the valve body 104) in the active state 1016, a torque of the packing nuts 308 can be increased without transmitting additional load to the valve packing 1002. In other words, when the stop 1014 is in the active state 1016, the stop 1014 via engagement with the valve body 104, prevents further deflection of the biasing element 1012 when the packing nuts 308 are further tightened. The stop 1014 engages the valve body 104 to mechanically stop the biasing element 1012 from applying a load to the valve packing 1002 that is greater than a predetermined load (e.g., a maximum or nominal load).

In this example, the Belleville springs 1124 provide a uniform load to the valve packing 1002 and maintain such a uniform packing load during valve operation (e.g., valve stroking). In other words, the Belleville springs 1124 provide a substantially constant load to the packing ring retainer 1008 to exert a substantially constant compressive force on the packing rings 1004 (e.g., the packing seal). If the valve packing 1002 consolidates (e.g., due to wear), the Belleville springs 1124 decompress in the first rectilinear direction 235 to maintain a compressive force on the valve packing 1002 and thereby maintain the seal integrity of the valve packing 1002.

The example load apparatus 902 enables precise control over a desired packing stress imparted to the valve packing 1002 by enabling precise control of the amount of deflection of the biasing element 1012. Such accurate control of the packing stress significantly improves the performance of the valve packing assembly and significantly reduces packing stress variability compared to known methods of loading valve packings such as those described above. Thus, the load apparatus 902 limits the packing stress applied to the valve packing 1002 to a load that corresponds to the amount of deflection provided by the stop 1014 (e.g., the dimension 1128 of the wall 1108).

The load apparatus 102, 902 provides means for guiding a biasing element. In some examples, the guide 220, 1010 provides means for guiding a biasing element. In some examples, the guide 220, 1010 and the fasteners 302, 904 provide means for guiding the biasing element. In some examples, the cavity 502, 1116 provides means for receiving (e.g., a biasing element). In some examples, the wall 404, 1108 and the shoulder 504, 1114 provide means for receiving. In some examples, the guide 220, 1010 provides means for stopping. In some examples, the wall 404, 1108 provides means for stopping. In some examples, the guide 220, 1010 and the packing follower 222 provides a means for stopping. In some examples, the biasing element 218, 1012 provides means for biasing. In some examples, the Belleville springs 806, 1124 provide means for biasing. In some examples, the packing follower 222 provides means for transferring a load. In some examples, a packing ring retainer 1008 provides means for transferring a load. In some examples, the valve packing 214, 1002 provides means for sealing a bore or shaft.

Although the example load apparatus 102 and 902 disclosed above have certain features, it should be understood that it is not necessary for a particular feature of one example load apparatus 102, 902 to be used exclusively with that example. Instead, any of the features of the example load apparatus 102, 902 described above and/or depicted in the drawings can be combined with any of the example load apparatus 102, 902, in addition to or in substitution for any of the other features of those examples. One example's features are not mutually exclusive to another example's features. Instead, the scope of this disclosure encompasses any combination of any of the features. In some examples, a load apparatus disclosed in accordance with the teachings of this disclosure may have a combination of the features of the example load apparatus 102, 902 disclosed herein.

Although certain methods and apparatus have been described herein, the scope of coverage of this patent is not limited thereto. To the contrary, this patent covers all methods and apparatus fairly falling within the scope of the appended claims either literally or under the doctrine of equivalents.

What is claimed is:

1. A load apparatus to load a valve packing of a fluid valve, the load apparatus comprising:
  a guide including a flange and a wall protruding from the flange, the wall defining a cavity to receive a biasing element and a stop positionable between a non-active state and an active state, the stop in the non-active state to enable movement of the guide in a first rectilinear direction relative to a longitudinal axis of a packing bore of the fluid valve and the stop in the active state to prevent movement of the guide in the first rectilinear direction to control an amount of deflection of the biasing element in the first rectilinear direction, the biasing element to at least partially extend into a recessed portion of a body of the fluid valve in response to movement of the guide.

2. The load apparatus as defined in claim 1, wherein the flange includes a first aperture to receive a fastener, the guide to move relative to the longitudinal axis via the fastener when the guide and the fastener are coupled to the fluid valve.

3. The load apparatus as defined in claim 2, wherein the wall is an annular wall and the first aperture passes through the annular wall and the flange.

4. The load apparatus as defined in claim 1, wherein the guide is a unitary piece or structure.

5. The load apparatus as defined in claim 1, wherein the guide includes a first opening coaxially aligned with the longitudinal axis, the guide to receive a shaft of an actuator via the first opening.

6. The load apparatus as defined in claim 5, wherein the cavity has a first diameter and the first opening has a second diameter smaller than the first diameter.

7. The load apparatus as defined in claim 5, further including a packing follower to couple to the guide via a fastener, the packing follower having a second opening to coaxially align with the first opening when the packing follower couples to the guide.

8. The load apparatus as defined in claim 7, wherein the guide is structured to move relative to the packing follower when the guide and the packing follower are coupled to the fluid valve.

9. The load apparatus as defined in claim 8, wherein the packing follower includes a lip protruding from a base, the lip to transfer a load from the biasing element positioned in the cavity to the valve packing of the fluid valve positioned in the packing bore when the guide and the packing follower are coupled to the fluid valve.

10. A load apparatus for loading a packing of a fluid valve, the load apparatus comprising:
  a guide at least partially disposed in a recessed portion of a body of the fluid valve, the guide movably coupled to the fluid valve, the guide defining a second body having a cavity and a stop, the second body forming a shoulder in the cavity between a first end of the second body and a second end of the second body opposite the first end, the stop protruding from the second body;
  a biasing element positionable in the cavity of the guide, the shoulder to engage a first end of the biasing element; and
  a third body to engage a second end of the biasing element opposite the first end, the guide to move in a first rectilinear direction toward the third body to deflect the biasing element when the stop is spaced from the third body, the guide being prevented from moving in the first rectilinear direction when the stop engages the third body to restrict further deflection of the biasing element in the first rectilinear direction to control an amount of deflection of the biasing element in the first rectilinear direction.

11. The load apparatus as defined in claim 10, wherein the guide includes a flange having a first aperture to receive a fastener, the fastener to engage a second aperture of the fluid valve that is coaxially aligned with the first aperture of the guide.

12. The load apparatus as defined in claim 10, wherein the third body includes a packing follower, the stop to engage the packing follower to mechanically stop the biasing element from applying a load to the packing of the fluid valve that is greater than a predetermined load.

13. The load apparatus as defined in claim 10, wherein the third body includes a packing follower, the guide having a first aperture and the packing follower having a second aperture aligned with the first aperture to receive a fastener, the guide and the packing follower to couple to the body of the fluid valve via the fastener.

14. The load apparatus as defined in claim 13, wherein the guide is movable relative to the packing follower and the packing follower is movable relative to the body of the fluid valve when the guide and the packing follower are coupled to the body of the fluid valve.

15. The load apparatus as defined in claim 13, wherein the guide includes the stop, and wherein the stop engages the packing follower to mechanically stop the biasing element from applying a load to the packing of the fluid valve that is greater than a predetermined load.

16. A load apparatus for loading a packing of a fluid valve, the load apparatus comprising:
   means for guiding a biasing element, the biasing element at least partially disposed in a recessed portion of a body of the fluid valve, the means for guiding including means for receiving and means for stopping, the means for stopping configured to be positionable between a non-active state and an active state, the means for stopping in the non-active state to enable movement of the means for guiding in a first rectilinear direction relative to a longitudinal axis of the means for receiving, and the means for stopping in the active state to prevent movement of the means for guiding in the first rectilinear direction relative to the longitudinal axis.

17. The load apparatus as defined in claim 16, wherein the biasing element is positioned in the means for receiving.

18. The load apparatus as defined in claim 17, wherein the means for stopping is to engage the fluid valve when the means for stopping is in the active state.

19. The load apparatus as defined in claim 17, further including means for transferring a load to the packing of the fluid valve, the means for transferring the load being movably coupled to the means for guiding.

20. The load apparatus as defined in claim 19, wherein the means for stopping is to engage the means for transferring when the means for stopping is in the active state.

\* \* \* \* \*

(12) EX PARTE REEXAMINATION CERTIFICATE (244th)
Ex Parte Reexamination Ordered under 35 U.S.C. 257

United States Patent
Jackson et al.

(10) Number: US 11,143,314 C1
(45) Certificate Issued: Jul. 8, 2024

(54) METHODS AND APPARATUS TO LOAD A VALVE PACKING

(71) Applicant: FISHER CONTROLS INTERNATIONAL LLC, Marshalltown, IA (US)

(72) Inventors: Trenton Frank Jackson, Marshalltown, IA (US); Wade Jonathon Helfer, Ames, IA (US)

(73) Assignee: FISHER CONTROLS INTERNATIONAL LLC

Supplemental Examination Request:
No. 96/000,418, Feb. 17, 2023

Reexamination Certificate for:
Patent No.: 11,143,314
Issued: Oct. 12, 2021
Appl. No.: 16/829,894
Filed: Mar. 25, 2020

(51) Int. Cl.
*F16K 5/06* (2006.01)
*F16J 15/18* (2006.01)
*F16K 5/20* (2006.01)
*F16K 41/02* (2006.01)
*F16K 41/04* (2006.01)

(52) U.S. Cl.
CPC .......... *F16K 5/0694* (2013.01); *F16J 15/186* (2013.01); *F16K 5/201* (2013.01); *F16K 41/026* (2013.01); *F16K 41/04* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,418, please refer to the USPTO's Patent Electronic System.

*Primary Examiner* — Glenn K Dawson

(57) ABSTRACT

Methods and apparatus to load a valve packing are described. An example load apparatus to load a valve packing includes a guide including a flange and a wall protruding from the flange. The wall defines a cavity to receive a biasing element and a stop movable between a non-active state and an active state. The stop in the non-active state to enable movement of the guide in a first rectilinear direction relative to a longitudinal axis of a packing bore of a fluid valve and the stop in the active state to prevent movement of the guide in the first rectilinear direction. The stop to control an amount of deflection of the biasing element in the first rectilinear direction when the stop is in the active state.

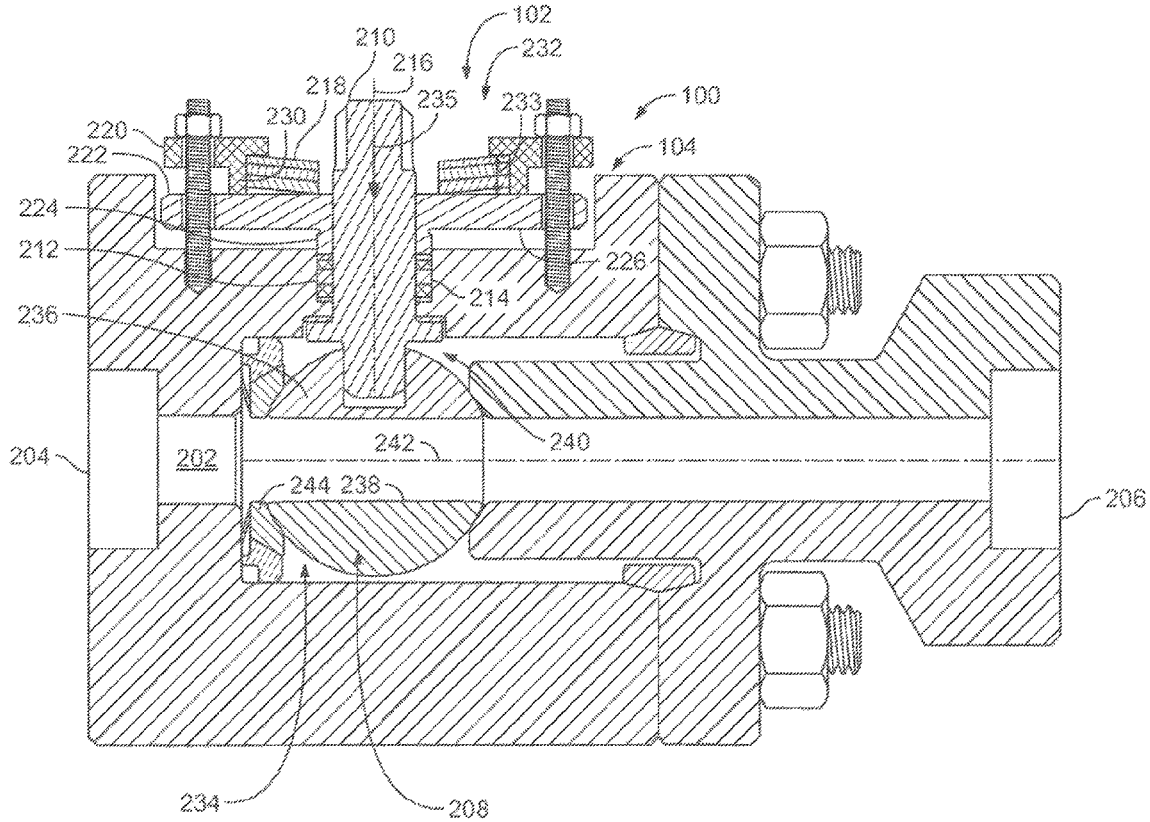

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 5, 7, and 17-19 are cancelled.

Claims 1, 2, 4, 6, 8-16, and 20 are determined to be patentable as amended.

1. A [load apparatus to load a valve packing of a] fluid valve[, the load apparatus] comprising:
   a first flange;
   a second flange;
   a body positioned between the first flange and the second flange, the body defining a recessed portion therein;
   a packing bore; and
   a load apparatus including:
      a biasing element; and
      a guide including a *third* flange and a wall protruding from the *third* flange, the wall defining (*a*) a cavity to receive [a] *the* biasing element and (*b*) a stop positionable between a non-active state and an active state, the stop in the non-active state to enable movement of the guide in a first rectilinear direction relative to a longitudinal axis of [a] *the* packing bore [of the fluid valve] and the stop in the active state to prevent movement of the guide in the first rectilinear direction to control an amount of deflection of the biasing element in the first rectilinear direction, the biasing element to at least partially extend into [a] *the* recessed portion of [a] *the* body [of the fluid valve] in response to movement of the guide, *the guide including a first opening coaxially aligned with the longitudinal axis, the guide to receive a shaft of an actuator via the first opening; and*
      *a packing follower coupled to the guide via a fastener, the packing follower having a second opening to coaxially align with the first opening when the packing follower couples to the guide.*

2. The [load apparatus] *fluid valve* as defined in claim 1, wherein the *third* flange includes a first aperture to receive [a] *the* fastener, the guide to move relative to the longitudinal axis via the fastener [when the guide and the fastener are coupled to the fluid valve].

4. The [load apparatus] *fluid valve* as defined in claim 1, wherein the guide is a unitary piece or structure.

6. The [load apparatus] *fluid valve* as defined in claim [5] *1*, wherein the cavity has a first diameter and the first opening has a second diameter smaller than the first diameter.

8. The [load apparatus] *fluid valve* as defined in claim [7] *1*, wherein the guide is structured to move relative to the packing follower [when the guide and the packing follower are coupled to the fluid valve].

9. The [load apparatus] *fluid valve* as defined in claim 8, wherein the packing follower includes a lip protruding from a base, the lip to transfer a load from the biasing element positioned in the cavity to the valve packing of the fluid valve positioned in the packing bore [when the guide and the packing follower are coupled to the fluid valve].

10. A [load apparatus for loading a packing of a] fluid valve[, the load apparatus] comprising:
   a first flange;
   a second flange;
   a body positioned between the first flange and the second flange, the body defining a recessed portion therein;
   a packing bore including a packing; and
   a load apparatus to load the packing, the load apparatus including:
      a guide at least partially disposed in [a] *the* recessed portion of [a] *the* body[of the fluid valve,], the guide movably coupled to the [fluid valve] *body*, the guide defining a second body having a cavity and a stop, the second body forming a shoulder in the cavity between a first end of the second body and a second end of the second body opposite the first end, the stop protruding from the second body *and disposed in the recessed portion*;
      a biasing element positionable in the cavity of the guide, the shoulder to engage a first end of the biasing element; and
      a third body to engage a second end of the biasing element opposite the first end, the guide to move in a first rectilinear direction toward the third body to deflect the biasing element when the stop is spaced from the third body, the guide being prevented from moving in the first rectilinear direction when the stop engages the third body to restrict further deflection of the biasing element in the first rectilinear direction to control an amount of deflection of the biasing element in the first rectilinear direction.

11. The [load apparatus] *fluid valve* as defined in claim 10, wherein the guide includes a flange having a first aperture to receive a fastener, the fastener to engage a second aperture of the fluid valve that is coaxially aligned with the first aperture of the guide.

12. The [load apparatus] *fluid valve* as defined in claim 10, wherein the third body includes a packing follower, the stop to engage the packing follower to mechanically stop the biasing element from applying a load to the packing of the fluid valve that is greater than a predetermined load.

13. The [load apparatus] *fluid valve* as defined in claim 10, wherein the third body includes a packing follower, the guide having a first aperture and the packing follower having a second aperture aligned with the first aperture to receive a fastener, the guide and the packing follower to couple to the body of the fluid valve via the fastener.

14. The [load apparatus] *fluid valve* as defined in claim 13, wherein the guide is movable relative to the packing follower and the packing follower is movable relative to the body of the fluid valve [when the guide and the packing follower are coupled to the body of the fluid valve].

15. The [load apparatus] *fluid valve* as defined in claim 13, wherein the guide includes the stop, and wherein the stop engages the packing follower to mechanically stop the biasing element from applying a load to the packing of the fluid valve that is greater than a predetermined load.

16. A [load apparatus for loading a packing of a] fluid valve[, the load apparatus] comprising:
   a first flange;
   a second flange;
   a body positioned between the first flange and the second flange, the body defining a recessed portion therein;
   a packing bore including a packing; and a load apparatus to load the packing, the load apparatus including:
  *a biasing element at least partially disposed in the recessed portion;*
means for guiding [a] *the* biasing element, [the biasing element at least partially disposed in a recessed portion of a body of the fluid valve,] the means for guiding including means for receiving and means for stopping, *the biasing element positioned in the means for receiving,* the means for stopping configured to be positionable between a non-active state and an active state, the means for stopping in the non-active state to enable movement of the means for guiding in a first rectilinear direction relative to a longitudinal axis of the means for receiving, and the means for stopping in the active state to prevent movement of the means for guiding in the first rectilinear direction relative to the longitudinal axis; *and*
  *means for transferring a load to the packing of the fluid valve, the means for transferring the load being movably coupled to the means for guiding.*

20. The [load apparatus] *fluid valve* as defined in claim [19] *16*, wherein the means for stopping is to engage the means for transferring when the means for stopping is in the active state.

\* \* \* \* \*